United States Patent
Morgan et al.

(10) Patent No.: US 6,632,468 B2
(45) Date of Patent: Oct. 14, 2003

(54) CONTROLLED-VISCOSITY FOOD FLAVORING SYSTEM

(75) Inventors: Ellen K. Morgan, Madison, WI (US); Joseph L. Klemaszewski, Roscoe, IL (US); Maurice O'Sullivan, Tralee (IE); Irwin W. Immel, Green Oaks, IL (US)

(73) Assignee: Kerry Inc., Beloit, WI (US)

( * ) Notice: Subject to any disclaimer, the term of this patent is extended or adjusted under 35 U.S.C. 154(b) by 210 days.

(21) Appl. No.: 09/930,226

(22) Filed: Aug. 16, 2001

(65) Prior Publication Data

US 2003/0044503 A1 Mar. 6, 2003

(51) Int. Cl.[7] .............................. A23L 1/22; A23L 1/221; A23L 1/236; A23L 1/39
(52) U.S. Cl. .................... 426/573; 426/576; 426/578; 426/580; 426/650
(58) Field of Search .................................. 426/573, 580, 426/586, 578, 576, 582, 583, 584, 650

(56) References Cited

U.S. PATENT DOCUMENTS

| | | | |
|---|---|---|---|
| 2,561,333 A | 7/1951 | Beckel et al. ............... 426/573 |
| 4,016,298 A | 4/1977 | Kasik et al. ................ 426/94 |
| 4,046,925 A | 9/1977 | Igoe | |
| 4,089,981 A | 5/1978 | Richardson | |
| 4,414,236 A | 11/1983 | Moran et al. | |
| 4,427,704 A | 1/1984 | Cheney et al. ............. 426/104 |
| 4,663,171 A | 5/1987 | Chevrolet | |
| 4,676,976 A | 6/1987 | Toba et al. ................ 424/485 |
| 4,678,676 A * | 7/1987 | Ishizuka et al. ............ 426/573 |
| 5,063,073 A | 11/1991 | Kratochvil | |
| 5,567,454 A | 10/1996 | Bogdan ........................ 426/93 |
| 5,681,602 A | 10/1997 | Alden et al. ................ 426/132 |
| 5,690,990 A | 11/1997 | Bonner ........................ 426/650 |
| 5,858,426 A * | 1/1999 | Bienvenu ...................... 426/96 |
| 5,895,677 A | 4/1999 | Lai | |
| 6,322,841 B1 | 11/2001 | Jackson et al. | |

FOREIGN PATENT DOCUMENTS

WO    WO 02/ 41702 A2    5/2002

* cited by examiner

Primary Examiner—Nina Bhat
(74) Attorney, Agent, or Firm—Birch, Stewart, Kolasch & Birch, LLP

(57) ABSTRACT

Composite food having a gelling agent, selected from gelatin, egg white, modified waxy maize starch, whey protein concentrate, modified potato starch, gellan gum, and rennet casein, and a flavoring and/or texturing component, uniformly distributed throughout, selected from nonfat dry milk, butter, enzyme modified cheese, BBQ seasoning blend, cheddar cheese, sugars, milk protein concentrate, vinegar, and partially hydrogenated soybean oil, with the remainder of the composite made up primarily of water. The composite food product is substantially solid and self-sustaining at ambient temperature. Also, method for preparing a flavored and/or textured food item for service by providing a servable portion of an optionally cooked food item, removing a servable portion of the self-sustainable food product from the food product, contacting the servable food portion with the servable food item portion to form a flavored and/or textured food item combination, normally arranged with the product on top of the food item, and optionally (d) heating the flavored and/or textured food item combination to prepare the food item for service.

18 Claims, No Drawings

CONTROLLED-VISCOSITY FOOD FLAVORING SYSTEM

FIELD OF THE INVENTION

The present invention relates to the art of foodstuffs. More particularly, the present invention relates to gel-based products that can be used to enhance the flavor and/or texture of consumable food items.

BACKGROUND OF THE INVENTION

Reversible flavored gels have long been known for various applications in the food industry. Some relevant patent disclosures (in chronological order) are discussed below:

U.S. Pat. No. 2,561,333 discloses a reversible gel made from soybeans. A soybean material, e.g., soybean flakes, is treated to extract oil and alcohol solubles. It is said that the alcohol solubles are anti-gelling factors in the soybean flakes. The alcohol-extracted proteinaceous residue is then extracted with water to obtain a proteinaceous material suspended in aqueous solution. Insoluble fibrous material is then separated and in the remaining phase evaporated to dryness. That remaining material is capable of forming a reversible gel upon the addition of alcohol thereto. Suggested uses for the reversible gel are wines, cognacs, and so forth, as well as other flavors. At temperatures of approximately 30° C. or below, a stable gel forms. That gel will become liquid if reheated.

U.S. Pat. No. 4,016,278 describes a mozzarella cheese-like substitute of emulsified fat (with water) and a particular neutralized casein. The gel which is formed is remeltable to a stringy consistency at temperatures between about 20° F. and 130° F. This patent thus teaches that reversible gels can be made with protein emulsifiers, i.e., the particular neutralized casein, although the composition involved is one of a relatively high fat ratio.

U.S. Pat. No. 4,427,704 describes various gels based on a variety of gelling agents including alginates and gums. The particular invention of this patent is based on a combination of glucomannan and carrageenan.

U.S. Pat. No. 4,676,976 is directed to a reversible gel formed with konjak mannan and xanthane gum, although other gums are also mentioned. The reversible gel can be flavored and can exhibit a wide range of properties, including properties of a meltable cheese.

U.S. Pat. No. 5,567,454 discloses a nut butter (peanut butter) and jelly food slice. The peanut butter is contained between layers of the jelly, and the jelly has been gelled with conventional gelling agents, e.g., pectin, gelatin, and agar, so that it is not sticky and may conveniently be handled with the fingers.

U.S. Pat. No. 5,681,602 discloses a heat-reversible gelled pizza sauce in disk form, which can be applied to a pizza crust. The disk is solid at room temperature or below but flows when the pizza is heated to higher temperatures. Among the categories of gelling agents described are proteins, and of these gelatin is a preferred gelling agent.

U.S. Pat. No. 5,690,990 is directed to a gelled spice-containing composition where the gelling agent can be conventional gums and gelatin but also may be casein. The spices are encapsulated in the composition and then used for providing flavors to various food products.

U.S. Pat. No. 5,858,426 discloses a meltable food product for applying seasonings to food or serving as a sauce for food. The product is designed to apply seasonings to food when it melts which occurs as the food is cooked. The product has a gel-like consistency and is comprised of water, a solidifying agent, a food base, and seasonings embedded in the product. Methods for making and using the product are also disclosed.

One feature that characterizes all of these disclosures is the application-specific nature of each gelled product. There is an unmet need for a broader, more flexible approach to gel-based products to enhance the flavor and/or texture of consumable food items.

SUMMARY OF THE INVENTION

The present invention provides a self-sustaining composite product comprising an edible gel having one or more flavoring and/or texturizing components distributed uniformly throughout. The products of this invention are substantially solid at ambient temperature and liquefy or otherwise change in texture at an elevated temperature.

A convenient configuration for the products of the present invention is a cylinder having size and consistency similar to that of canned jellied cranberry sauce. In another embodiment, the present products may have the form and consistency of slices of cheese. In both of these embodiments, the slices of product may be separated from one another by layers of paper or plastic, to facilitate handling. These products would not (necessarily) be initially "formed" on these separation layers.

The composite products of the present invention will preferably comprise 20–85 weight-% solids and 15–80 weight -% water or other edible liquids. Fats are optional ingredients, but when present will normally not exceed 40 weight-%. Gum content too is optional, but when present optimally ranges up to about 1 weight-%. Optimum pH for the composite products of the present invention ranges from 3 to 7. Low pH products should be used with caution. Protein content will preferably range from 3–12 weight-%, and starch content will preferably range from 3–20 weight-%. All of these ranges are optimum or preferred, rather than absolutely limiting of the present invention.

The present invention provides a composite food product comprising 0.3–20% (w/w) of at least one gelling agent selected from the group consisting of gelatin, egg white, egg white protein, albumin, wheat protein, whey protein, casein, soy protein, pea protein, starch, modified food starches, gellan gum, pectin, alginate, collagen, carrageenan, agar, and methylcellulose, and combinations of ingredients which combine to produce a gel, and 0.1–60% (w/w) of at least one flavoring component selected from the group consisting of sugars, salt, hydrolyzed proteins, spices, seasonings, vinegar, extracts, fruit juice, vegetable juice, juice concentrates, cheese, yogurt, cream cheese, sour cream, butter, smoke, malt, monosodium glutamate, enzyme modified cheeses, concentrated dairy products, natural flavors, artificial flavors, and high intensity sweeteners, and/or at least one texturing component selected from the group consisting of starches, modified food starches, guar gum, locust bean gum, xanthan gum, carrageenan, gum Arabic, maltodextrin, cellulose gum, corn syrup solids, whey proteins, milk proteins, casein, soy proteins, wheat proteins, meat proteins, plasma proteins, fats, oils, dextrins, monoglycerides, di-glycerides, lecithin, and sugars. When the flavoring and/or texturing agent is a basic ingredient such as salt or sugar, additional flavoring and/or texturing ingredients will be incorporated into the compositions of this invention.

The composite food product of the present invention may further comprise 5–40% (w/w) at least one fat and/or oil component selected from the group consisting of soybean, milk, coconut, cottonseed, corn, sunflower, canola, palm, peanut, tallow, lard, and butter. When this component is present, it is most preferably 10–30% (w/w) partially hydrogenated soybean oil.

This invention also provides a method for preparing a flavored and/or controlled texture food item for service. The method of this invention comprises the steps of: providing a servable portion of an optionally cooked food item, providing a servable portion of the self-sustaining composite food product and contacting said servable self-sustainable food product portion with said servable food item portion to form a flavored and/or textured food item combination. The method may further comprise the step of heating the flavored and/or textured food item combination to prepare the flavored and/or textured food item for service.

DETAILED DESCRIPTION OF THE INVENTION

Definitions

The terminology "self-sustaining" as applied herein to a product designates a product that requires no external support means. That differentiates the product of the present invention from the pizza sauce disk of U.S. Pat. No. 5,681,602, which is taught to be formed on a suitable non-edible surface or substrate. The terminology "distributed uniformly throughout" implies that a section taken from any portion sample of a product will have approximately the same composition as a sample taken from any other portion of that same sample. Thus the present product also differs from the sheet-shaped meltable product or wrap shown in U.S. Pat. No. 5,858,426. In that product, seasonings are sprinkled on a semisolid mixture so that they are embedded near its top surface, whereas in the present invention, the flavoring and/or texturizing agents are distributed substantially uniformly throughout the product. The terminology "functional amount" means an amount sufficient to effect a result, such as flavoring or texturing, that is discernable to consumers of the present products. It is noted that in some cases, a single component may have a discernable effect on two or more of flavor and/or texture and/or gelling.

Gelling

The product of the present invention may include an edible heat-reversible gelling agent which causes partial or complete gelling of the product at ambient temperature and allows melting of the gel structure when a food item topped with the product is heated. The gelling agent used in the product of this invention can be selected from any of various suitable substances, such as proteins, gums, polysaccharides, starches, and the like, which enable formation of a heat-reversible gel structure within the product.

In other embodiments of the present invention, however, heat-reversible gelling is not desired. For instance, when the products of the present invention are to be used as cheese-like condiments for the preparation of products resembling cheeseburgers, one would choose gelling agents and other components to provide a product that would soften rather than melt at the preparation and serving temperatures of the burger. Similarly, when the products of the invention are similar to fried mozzerella sticks, the products would soften rather than melt. Thus, generically, for the present products, heating above ambient temperature results in a controlled change in texture.

Gelling Agent

The terminology "gelling agent" as used herein refers to components that form a solid or semi-solid matrix in the applications described herein. The gelling agent may be a single ingredient which interacts with water or it may consist of multiple ingredients which in themselves may not necessarily form a gel with water but do so when used in combination. The levels of gelling agents described herein are understood to be at least partially hydrated and functional.

Products of the present invention will generally comprise from 15–80 wt-% water and from 0.3–20 wt-% of at least one functioning gelling agent. The gelling agent should generally disperse readily in the other ingredients of the product to form a substantially uniform mixture. When the product is gelled, the gelling agent should provide the desired consistency and forming strength in the resulting composite product.

The Components

The type of fat used in the composite products of this invention, if any, is not critical. The melting point of the fat is not a significant issue, due to the incorporation of gelling agent into the composite products. Optimal fat melting points range from 90–115° F. Likewise, the flavor of the fat is not significant due to the seasoning level of the products of the invention. Typical edible fats suitable for use in the present invention include those derived from soybean, milk, coconut, cottonseed, corn, sunflower, canola, and palm.

Gelling-type proteins, including gelatin, collagen, plasma proteins, hydrolyzed meat proteins, egg protein, pea protein, wheat protein, and whey protein, can be used to make the composite products of this invention. Non gelling proteins, such as soybean, milk, and rice proteins, can also be used herein.

Gelling-type starches, including higher amylose starches and modified starches such as modified waxy maize and modified potato starch, can likewise be used to make the composite products of the present invention. Starches that are not gelling agents can still contribute to the viscosity of the system. The viscosity contributed by the starches is dependent on the type of starch and the concentration at which it is used and the processing conditions. Higher viscosity starches can prevent the floating or settling of spices and particulates. Useful starches of this type include potato, tapioca, modified tapioca, corn, and modified dent starches.

Combinations of proteins with starches can be important as gelling agents in the present invention. For instance, proteins such as wheat, egg, rice, pea, and beef proteins employed in combination with modified dent, modified potato, wheat, or rice starches are quite useful as gelling agents herein.

Gums that are gelling agents can also be used. Agar, for instance, can be used as a primary gelling agent. Gums that are not gelling agents can contribute to the overall viscosity of the system. Gums that impart medium to high hot viscosity—such as xanthan, guar, and locust bean gums and blends thereof, are important in maintaining the stability of suspended particulate flavoring and/or texturing agents.

Thus, specific examples of suitable gelling agents include gelatin, starch (e.g., modified food starch), alginate, pectin, collagen, carrageenan, agar, methylcellulose, and combinations of gums such as xanthan and locust bean gum. Suitable proteins include plasma proteins, hydrolyzed meat proteins, egg protein, pea protein, wheat protein, and whey protein concentrate. Finally, as discussed above, combinations of such gelling agents may also be employed. Specific examples of preferred gelling agents that can be used in the present invention are: gelatin, modified waxy maize starch, and rennet casein.

Specific examples of flavoring components that can be used in the present invention are: nonfat dry milk, butter, enzyme modified cheese, salt, garlic powder, vinegar, acesulfame potassium, sugars, lactic acid, BBQ seasoning blend, cheddar cheese, autolyzed yeast extract, and starter distillate. When simple flavoring agents such as salt and/or sugars are used, they are typically used in combination with additional flavoring agents.

Specific examples of texturing components that can be used in the present invention are: milk protein concentrate, nonfat dry milk, guar gum, xanthan gum, mono- and di-glycerides, tapioca dextrin, sodium caseinate, butter, sugars, cheddar cheese, and partially hydrogenated soybean oil.

Typical Combinations

A typical composite product of the present invention may contain the following ingredients:

| Ingredient | % weight/weight |
| --- | --- |
| Partially hydrogenated soybean oil | 15–30% |
| Butter | 10–20% |
| Gelatin | 3–7% |
| Milk protein concentrate | 2–6% |
| Non-fat dry milk | 2–6% |
| Modified waxy maize starch | 2–6% |
| Salt | 0–5% |
| Guar gum | <2% |
| Xanthan gum | <2% |
| Disodium phosphate | <2% |
| Garlic powder | <5% |
| Natural flavors | <2% |
| Food coloring | as needed |
| Water | 20–65% |
| | 100.000 |

Those skilled in the art will appreciate, however, that one advantage of the system taught herein is the ability to vary both the nature and the amounts of the compositional components widely, to make a wide range of composite products comprising an edible gel having one or more flavoring and/or texturizing components distributed uniformly throughout.

Manufacturing the Composite Product

In a typical manufacturing process, the gelling agent is mixed with the other ingredients in suitable amounts and the mixture is heated to the melting point of the gelling agent to cause activation thereof. The order of addition of the ingredients should be planned to allow for hydration of a functional amount of starches, proteins, and gums that may be included in the formulation.

The present product requires agitation in order to incorporate all of the ingredients and stabilize the emulsion. This is especially critical for products with a low hot viscosity. A wide range of conventional stirring equipment can be used. The best processing for all types of formulations is provided by high shear mixing equipment, such as a LIKWIFIER® mixer for batch processing. Formulas with low to medium viscosity at processing temperatures can be processed using a colloid mill in continuous or batch operations. A valve homogenizer (with pressures sufficient to achieve the desired emulsion) may be used for thin formulations. The amount of shear and agitation on products with spices or other particulates should be carefully controlled, inasmuch as high shear may deteriorate those components.

Processing temperature must be high enough to hydrate a functional amount of any starches and/or proteins in the composite formulation. Pasteurization temperatures should be the minimum processing temperatures necessary to treat microbially-susceptible products. The type of heating equipment is not critical to the system. However, lower moisture systems cannot be processed using direct steam heating since moisture addition is limited in these products. With low moisture products, indirect heating is optimal, unless the product is susceptible to burn-on. Cooling during processing can be used to prevent stratification of ingredients.

The heated mixture is cooled to a suitable temperature to effect formation of a three dimensional product. This self-sustaining gel product will preferably have medium hardness, low to medium brittleness, and medium to high elasticity, as compared to other gels and as measured using an instrument such as an Instron model 4201. The hardness of the gel is measure by determining the force required to cause rupture of the gel during compression. Brittleness is a measure of the amount the gel can be squeezed before it breaks. Elasticity is a measure of the amount the gel springs back after being squeezed. Once the desired gel structure has been achieved, the composite product may be bagged, canned, or even frozen for extended shelf life if desired.

Using the Composite Product

Another aspect of the present invention contemplates a method for preparing a flavored and/or textured food item for service. The inventive method includes the steps of: (a) providing a servable portion of an optionally cooked food item, (b) removing a servable portion, e.g., a disk or a cube, of the self-sustainable food product described above from the food product, (c) contacting the servable food portion with the servable food item portion to form a flavored and/or textured food item combination, normally arranged with the product on top of the food item, and (d) heating, for instance in a microwave oven, said flavored and/or textured food item combination to prepare the food item for service. The present method differs significantly from that disclosed in U.S. Pat. No. 5,858,426, which describes a meltable food product for applying seasonings to foods such as (whole) chicken.

In some cases where the step (a) food portion retains sufficient heat from cooking, step (d) is not necessary. The heat from the cooked food item can provide the necessary energy to modify the texture of the self-sustainable food product of this invention. Alternatively to step (b), the servable portion of the self-sustainable food product of this invention can be prepared initially as a disk or a cube. It should be noted that the term "cube" is used herein to designate a three-dimensional product of a dicing operation. It is not intended to indicate an object having precisely equal length, width, and height.

EXAMPLES

The following non-limiting Examples are presented solely for the purpose of illustrating various aspects of the present invention.

Example 1

Butter Garlic

| BUTTER GARLIC | |
| --- | --- |
| Ingredient | % weight/weight |
| Water | 35.0 |
| Partially hydrogenated soybean oil | 25.0 |
| Butter | 15.0 |
| Gelatin | 5.0 |
| Milk protein concentrate | 5.0 |

-continued

BUTTER GARLIC

| Ingredient | % weight/weight |
|---|---|
| Modified waxy maize starch | 5.0 |
| Nonfat dry milk | 4.0 |
| Salt | 2.0 |
| Garlic powder | 1.5 |
| Disodium phosphate | 1.0 |
| Guar gum | 0.5 |
| Xanthan gum | 0.5 |
| Natural flavors | 0.5 |
| Food coloring | as needed |

Example 2

Barbecue

BARBECUE

| Ingredient | % weight/weight |
|---|---|
| Water | 34.3 |
| Vinegar | 20.0 |
| BBQ seasoning blend | 15.0 |
| Partially hydrogenated soybean oil | 10.0 |
| Sugars | 10.0 |
| Gelatin | 5.0 |
| Tapioca dextrin | 4.0 |
| Mono- and di-glycerides | 1.0 |
| Xanthan gum | 0.5 |
| Acesulfame potassium solution | 0.5 |
| Preservatives | as needed |

Example 3

Diced Cheddar

DICED CHEDDAR

| Ingredient | % weight/weight |
|---|---|
| Water | 35 |
| Partially hydrogenated soybean oil | 20.0 |
| Rennet casein | 15.0 |
| Cheddar cheese | 10.0 |
| Modified waxy maize starch | 6.0 |
| Milk protein concentrate | 5.0 |
| Sodium caseinate | 2.5 |
| Enzyme modified cheeses | 2.5 |
| Salt | 2.0 |
| Autolyzed yeast extract | 1.0 |
| Sodium citrate | 1.0 |
| Disodium phosphate | 0.7 |
| Lactic acid | 0.5 |
| Natural flavors | 0.3 |
| Preservatives | as needed |
| Food coloring | as needed |

The present invention has been described in detail with reference to particular specific embodiments. It will be understood by those skilled in the art, however, that numerous modifications thereof and alternatives thereto can be effective within the spirit and scope of this invention.

What is claimed is:

1. A composite food flavoring and/or texturing product comprising:

3–20% (w/w) of at least one gelling agent selected from the group consisting of gelatin, egg white, egg white protein, albumin, wheat protein, whey protein, casein, soy protein, pea protein, starch, modified food starches, gellan gum, pectin, alginate, collagen, carrageenan, agar, and methylcellulose, and combinations of ingredients which combine to produce a gel, 0.1–60% (w/w) of at least one flavoring component selected from the group consisting of hydrolyzed proteins, spices, seasonings, vinegar, extracts, fruit juice, vegetable juice, juice concentrates, cocoa, cocoa butter, chocolate liquor, cheese, yogurt, cream cheese, sour cream, butter, smoke, malt, monosodium glutamate, enzyme modified cheeses, concentrated dairy products, natural flavors, artificial flavors, and high intensity sweeteners, 0.1–60% (w/w) of at least one texturing component selected from the group consisting of starches, modified food starches, guar gum, locust bean gum, xanthan gum, carrageenan, gum Arabic, maltodextrin, cellulose gum, corn syrup solids, whey proteins, milk proteins, casein, soy proteins, wheat proteins, meat proteins, plasma proteins, fats, oils, dextrins, mono-glycerides, di-glycerides, and lecithin, and 20–65% (w/w) water, wherein said food flavoring and/or texturizing product is a self-sustaining solid at ambient temperature and liquefies or softens when heated on a food product.

2. The composite food flavoring and/or texturing product of claim 1, in the form of a three dimensional shape.

3. The composite food flavoring and/or texturing product of claim 2, in the form of a cylinder, disk, slice, cube, or shred.

4. The composite food flavoring and/or texturing product of claim 1, further comprising 5–40% (w/w) at least one fat and/or oil component selected from the group consisting of soybean, milk, coconut, cottonseed, corn, sunflower, canola, palm, peanut, tallow, lard, and butter.

5. The composite food flavoring and/or texturing product of claim 4, comprising 20–85% (w/w) solids comprising said gelling agent, said flavoring and/or texturing component, and said fat and/or oil component and 15–80% (w/w) water.

6. The composite food flavoring and/or texturing product of claim 5, comprising 10–30% (w/w) partially hydrogenated soybean oil.

7. The composite food flavoring and/or texturing product of claim 5, having a pH of 3–8.

8. The composite food flavoring and/or texturing product of claim 7, having a pH of 3–6.

9. The composite food flavoring and/or texturing product of claim 7, having a pH of 3–5.

10. The composite food flavoring and/or texturing product of claim 7, having a pH of 5–8.

11. The composite food flavoring and/or texturing product of claim 7, having a pH of 5.5–7.5.

12. A composite food product comprising:

3–20% (w/w) of at least one gelling agent selected from the group consisting of gelatin, egg white, egg white protein, albumin, wheat protein, whey protein, casein, soy protein, and pea protein, used alone or in combination, 0.1–60% (w/w) of at least one flavoring component selected from the group consisting of hydrolyzed proteins, spices, seasonings, vinegar, extracts, fruit juice, vegetable juice, juice concentrates, cocoa, cocoa butter, chocolate liquor, cheese, yogurt, cream cheese, sour cream, butter, smoke, malt, monosodium glutamate, enzyme modified cheeses, concentrated dairy products, natural flavors, artificial flavors, and high intensity sweeteners, 0.1–60% (w/w) of at least one texturing component selected from the group consisting of starches, modified food starches, guar gum, locust bean gum, xanthan gum, carrageenan, gum Arabic, maltodextrin, cellulose gum, corn syrup solids, whey proteins, milk proteins, casein, soy proteins, wheat proteins, meat proteins, plasma proteins, fats, oils, dextrins, mono-glycerides, di-glycerides, and lecithin, and 20–65% (w/w) water, wherein said food flavoring and/or texturizing product is a self-sustaining solid at ambient temperature and liquefies or softens when heated on a food product.

13. The composite food flavoring and/or texturing product of claim 12, comprising 3–12% (w/w) of said gelling agent.

14. A composite food flavoring and/or texturing product comprising:

3–20% (w/w) of at least one gelling agent selected from the group consisting of starch, modified food starches, gellan gum, pectin, alginate, collagen, carrageenan, agar, and methylcellulose, used alone or in combination; and 0.1–60% (w/w) of at least one flavoring component selected from the group consisting of hydrolyzed proteins, spices, seasonings, vinegar, extracts, fruit juice, vegetable juice, juice concentrates, cocoa, cocoa butter, chocolate liquor, cheese, yogurt, cream cheese, sour cream, butter, smoke, malt, monosodium glutamate, enzyme modified cheeses, concentrated dairy products, natural flavors, artificial flavors, and high intensity sweeteners, and/or at least one texturing component selected from the group consisting of starches, modified food starches, guar gum, locust bean gum, xanthan gum, carrageenan, gum Arabic, maltodextrin, cellulose gum, corn syrup solids, whey proteins, milk proteins, casein, soy proteins, wheat proteins, meat proteins, plasma proteins, fats, oils, dextrins, mono-glycerides, di-glycerides, and lecithin, and 20–65% (w/w) water, wherein said food flavoring and/or texturizing product is a self-sustaining solid at ambient temperature and liquefies or softens when heated on a food product.

15. A composite food flavoring and/or texturing product comprising:

0.3–20% (w/w) of at least one gelling agent is a combination of locust bean gum and carrageenan, used alone or in combination with a second gelling agent, 0.1–60% (w/w) of at least one flavoring component selected from the group consisting of hydrolyzed proteins, spices, seasonings, vinegar, extracts, fruit juice, vegetable juice, juice concentrates, cocoa, cocoa butter, chocolate liquor, cheese, yogurt, cream cheese, sour cream, butter, smoke, malt, monosodium glutamate, enzyme modified cheeses, concentrated dairy products, natural flavors, artificial flavors, and high intensity sweeteners, 0.1–60% (w/w) of at least one texturing component selected from the group consisting of starches, modified food starches, guar gum, locust bean gum, xanthan gum, carrageenan, gum Arabic, maltodextrin, cellulose gum, corn syrup solids, whey proteins, milk proteins, casein, soy proteins, wheat proteins, meat proteins, plasma proteins, fats, oils, dextrins, mono-glycerides, di-glycerides, and lecithin, and 20–65% (w/w) water, wherein said food flavoring and/or texturizing product is a self-sustaining solid at ambient temperature and liquefies or softens when heated on a food product.

16. A method for preparing a flavored and/or controlled texture food item for service, which comprises the steps of:

providing a servable portion of an optionally cooked food item, providing a servable portion of the self-sustaining composite food flavoring and/or texturing product of claim 1, and contacting said servable self-sustainable food flavoring and/or texturing product portion with said servable food item portion to form a flavored and/or textured food item combination.

17. The method of claim 16, further comprising the step of:

heating said flavored and/or textured food item combination to prepare said flavored and/or textured food item for service.

18. The method of claim 16, wherein said servable portion of the self-sustainable food flavoring and/or texturing product is a disk or a cube that has been separated from a non-servable form of the self-sustaining food flavoring and/or texturing product or from an inedible support material.

* * * * *